Sept. 19, 1961 R. L. SCHMIDT ET AL 3,000,305
GRAIN IMMOBILIZER
Filed Nov. 2, 1955 2 Sheets-Sheet 1

INVENTORS
ROBERT L. SCHMIDT
ARTHUR H. MILLER
DAVID D. GRIMES
BY
ATTORNEYS

INVENTORS
ROBERT L. SCHMIDT
ARTHUR H. MILLER
DAVID D. GRIMES
BY
ATTORNEYS

United States Patent Office 3,000,305
Patented Sept. 19, 1961

3,000,305
GRAIN IMMOBILIZER
Robert L. Schmidt, Arthur H. Miller, and David D. Grimes, Silver Spring, Md., assignors to the United States of America as represented by the Secretary of the Navy
Filed Nov. 2, 1955, Ser. No. 544,616
8 Claims. (Cl. 102—49)

This invention relates generally to aerial vehicles, and more particularly it relates to an improved braking apparatus for preventing the displacement of and possible damage to the propellent grains of a sustainer rocket of a missile during flight thereof. In addition, the apparatus in preventing grain displacement also eliminates shock of the missile components.

An improved braking apparatus for a rocket powered missile utilizing propellent grains is disclosed in a patent application entitled "Rocket Grain Braking Apparatus," Serial No. 358,928, filed June 1, 1953, by David D. Grimes now Patent Number 2,798,430. The braking apparatus described in this patent application is constructed of essentially a cylindrical housing having a tapered axial recess and an inner member containing a set back arming mechanism for retaining the apparatus in an inoperative condition.

A ball race is disposed in the tapered recess of the housing between the housing and the inner member to brake the relative movement of the housing and the inner member in one direction. The inner member is connected to a plate fixed to the forward end wall of the sustainer rocket casing of the missile and the housing engages a second plate which is caused to bear upon the propellent grains contained in the casing.

In order to prevent undesirable binding of the ball race to the inner member and the housing, it has become necessary to retain the ball race out of engagement with the tapered portion of the housing. For the same reason it has also become necessary to provide means for alining the inner member with the axial recess of the housing.

The principal object of this invention, therefore, is to provide means for preventing undesirable binding in a rocket grain braking apparatus.

A further object of this invention is to provide means for retaining the ball race of a rocket grain braking apparatus in an inoperative position.

Further objects and advantageous features of the invention will become evident from the following detailed description taken in conjunction with the accompanying drawings, in which:

FIG. 4 is an enlarged section on line 4—4 of FIG. 1; and

FIG. 5 is a longitudinal section through the forward end of a sustainer rocket illustrating the rocket grain braking apparatus in position, with certain details thereof being shown in elevation.

In accordance with the invention, there is provided in an aerial vehicle having a sustainer rocket casing containing propellent grains, a braking apparatus for preventing the shifting of the grains in the casing. This apparatus comprises a plate secured to the forward end wall of the sustainer rocket casing, with a post secured to the plate. A second plate is movably connected to the first plate and is arranged to engage the propellent grains.

A coil spring is provided between the first and second plates for urging the second plate to bear upon the propellent grains. An internally tapered sleeve is mounted on the second plate coaxial with the post, with a ball race being coaxially disposed on the post. Means are provided for supporting the ball race out of engagement with the sleeve, together with means for releasing the supporting means to permit the ball race to move into engagement with the sleeve.

Figure 1:
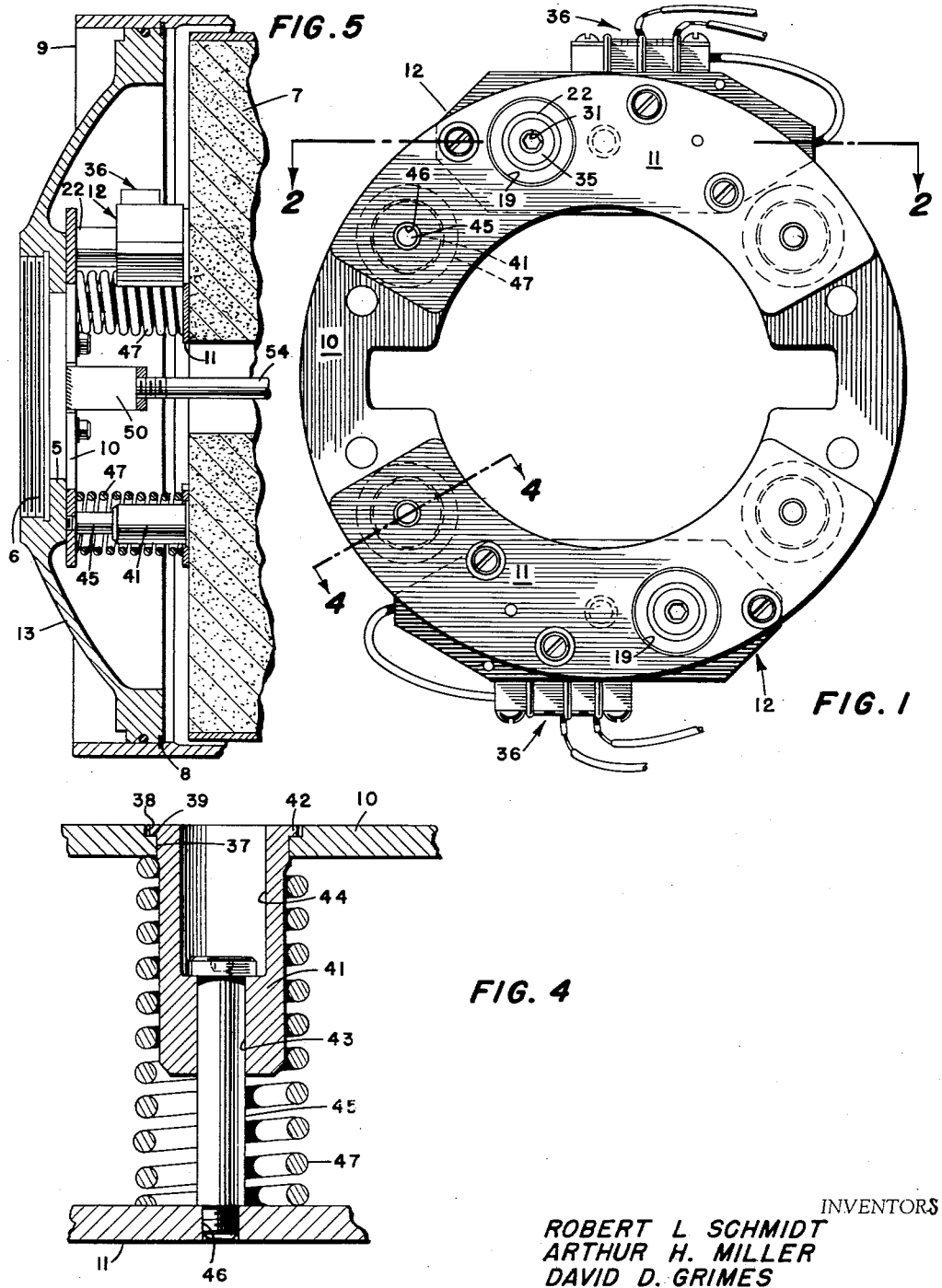
FIG. 1 is a plan view of the improved rocket grain braking apparatus constituting this invention.

Referring now to FIGS. 1 and 5, of the drawings, there is shown generally an annular plate 10 for attachment to the forward end 13 of a sustainer casing 9 (only a portion of which is shown) of a rocket powered missile. Arcuate pressure plates 11 are connected to the annular plate 10 through two braking units 12.

The rocket casing 9 contains propellent grains 7. The forward end portion 13 of the sustainer casing 9 is held in place in the casing by a retaining ring 8. The forward end portion 13 is provided with an axial coupling sleeve 6 having an inwardly directed flange 5. A U-shaped bracket 50 has its ends welded to plate 10 and supports a resonance rod 54 which passes axially through the propellent grains 7 and terminates at the rear of casing 9. Such rods are commonly employed in rockets to prevent the braking up of the propellent grains 7 during burning. This casing construction permits the accommodation of an igniting mechanism (not shown) which forms no part of the present invention.

Figure 2:
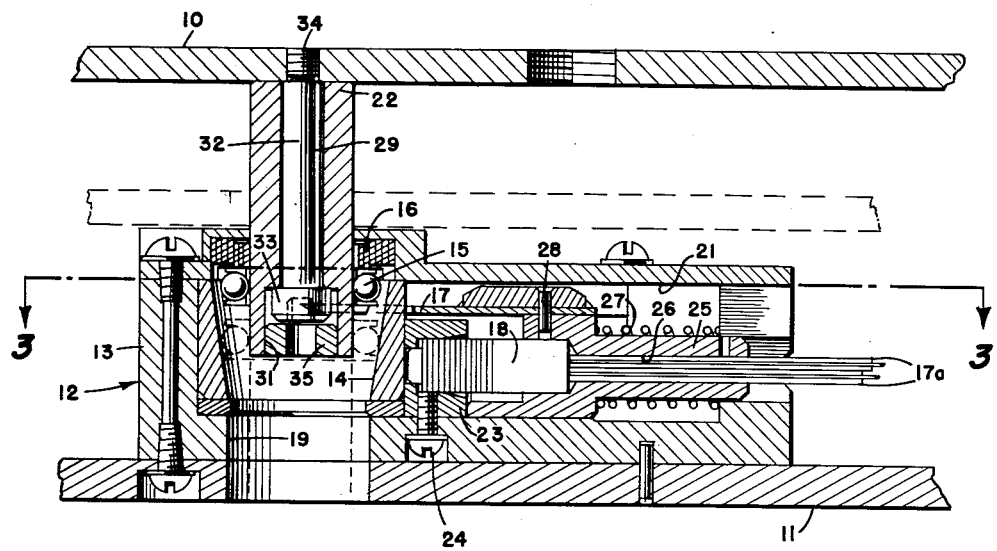
FIG. 2 is an enlarged section taken on line 2—2 of FIG. 1, illustrating a unit of the braking apparatus embodying the present invention.
Figure 3:
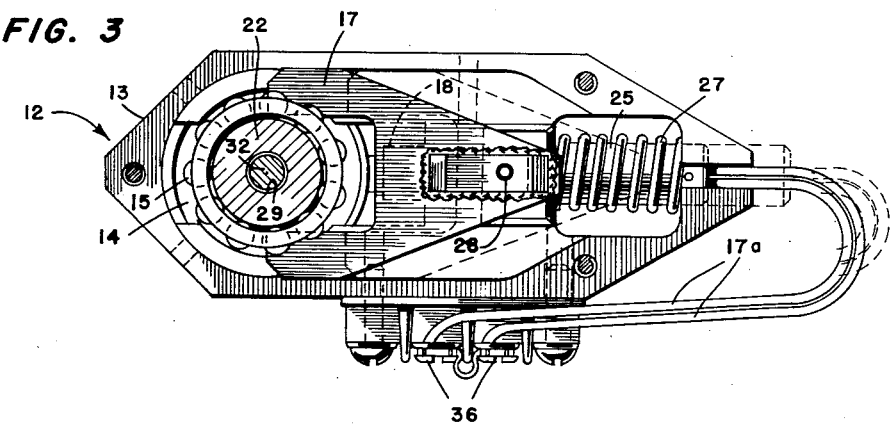
FIG. 3 is a section on line 3—3 of FIG. 2.

As best shown in FIGS. 2 and 3, two identical braking units 12 are employed and each includes a housing 13 secured to the pressure plate 11 and contains an internally tapered sleeve 14, a ball race 15, a volute spring 16, a mechanism including a flat yoke 17, and an explosive bellows 18 for releasing the ball race from its inoperative position.

The housing 13 is constructed with an opening 19 passing therethrough and a chamber 21 communicating with the opening. The sleeve 14 is positioned in the chamber 21 above the opening 19 and is adapted to receive an inner member or post 22, the construction of which will be described hereinafter. Ball race 15 is a positioned within the sleeve 14 and is normally maintained out of engagement therewith by the yoke 17 which is mounted in the chamber 21 and has legs extending to engage the ball race. The volute spring 16 is positioned above the ball race 15 to urge the ball race toward engagement with the tapered sleeve 14.

The explosive bellows 18 has one end supported in a mounting sleeve 23, which, in turn, is secured in the chamber 21 by a screw 24. The other end of the explosive bellows 18 is received in a block 25 which is slidably mounted in the chamber 21 and has a bore 26 passing therethrough and is urged by a coil spring 27 towards the mounting sleeve 23. The yoke 17 is attached to the block 25 by a pin 28. Ignition wires 17a are connected to the explosive bellows 18, and pass through the bore 26 of the block 25 and out of the housing 13.

The post 22 is formed with an axial bore 29 passing completely therethrough and through a recess 31 in one end. A bolt 32, having a head 33 at one end and a threaded portion 34 at its other end, is positioned in the bore 29 with the head 33 thereof disposed in the recess 31. The bolt 32 is secured to the annular plate 10 to connect the post 22 to said plate. The relative sizes of the bolt 32 and the bore 29 are such that there is sufficient clearance to permit slight lateral movement of the post 22 on the bolt. A plug 35 is press-fitted into the recess 31 to provide reenforcement for the lower end portion of the post 22.

The ignition wires 17a from the explosive bellows 18 are connected to suitable terminals 36 mounted on the housing 13 to facilitate the electrical connection of the explosive bellows 18 to a power source (not shown).

As best seen in FIG. 4, each pressure plate 11 is connected at its opposite ends to the annular plate 10. The annular plate 10 is formed with an opening 37 and a recess 38 defining a shoulder 39. A sleeve 41, formed with a flange 42 at one end, passes through the opening 37 in the pressure plate 11 so that the flange 42 engages the shoulder 39 of the pressure plate. The sleeve 41 is further formed with an axial bore 43 and an axial recess 44 in the flanged end portion. A bolt 45, having a head at one end and a threaded portion at the other end, is positioned in the bore 43 with the head being disposed in the recess 38. The threaded end of the bolt 45 engages a similarly threaded hole 46 in the pressure plate 11. A coil spring 47 is positioned about the sleeve 41 between the pressure plate 11 and the annular plate 10 to urge the separation thereof.

The pressure plates 11 of the braking units 12 are urged by the coil springs 47 into engagement with the propellent grains in the sustainer rocket casing 9. In this manner, the pressure plates 11 continuously engage the propellent grains 7 despite thermally induced changes in dimensions of the grains.

In operation, after firing a missile employing the braking apparatus of this invention, the pressure plates 11, with the braking units 12 thereon, are urged under set back forces and the urgings of the coil springs 47 into engagement with the propellent grains 7.

At a time subsequent to the cessation of set back forces when the missile is no longer accelerating, an electric charge is applied to the igniter of the explosive bellows 18 to engage and expand the bellows. The block 25 is caused to move against the coil spring 27 by the expanding bellows. The movement of the block 25 causes the yoke 17 to move out of supporting engagement with the ball race 15, permitting it to drop into engagement with the tapered sleeve 14. The volute spring 16 provides a motivating force for the ball race 15, causing the tight engagement thereof with the tapered sleeve 14 and the post 22. Thus it will be seen that forward movement of the pressure plate 11, by movement of the grains 7 due to reverse set back, is prevented by the wedging action of the ball race 15 between the tapered sleeve 14 and the post 22.

The post 22, by virtue of its loose relation to the bolt 32, is permitted to shift laterally to aline with the ball race 15 and the tapered sleeve 14.

Obviously many modifications and variations of the present invention are possible in the light of the above teachings. It is, therefore, to be understood that within the scope of the appended claims the invention may be practiced otherwise than as specifically described.

What is claimed is:

1. In a sustainer rocket casing containing a propellent grain, a braking apparatus for preventing the shifting of said grain in said casing, said apparatus comprising a first plate secured to the forward end wall of said casing, a post secured to said first plate, a second plate movably connected to said first plate and engaging the propellent graint, a coil spring between said plates for urging said second plate to bear upon said propellant grain, an internally tapered sleeve mounted on said second plate coaxial with said post, a ball race coaxially disposed on said post, means for supporting said ball race out of engagement with said sleeve, and means for releasing said supporting means to permit said ball race to move into engagement with said sleeve.

2. A braking apparatus for preventing the shifting of a propellent grain in a sustainer rocket casing of an aerial missile, said apparatus comprising a first plate secured to one end of said casing, a post secured to said first plate, a second plate movably connected to said first plate and engaging said propellent grain, a coil spring between said plates for urging said second plate to bear upon said propellent grain, an internally tapered sleeve mounted on said second plate coaxial with said post, a ball race coaxially disposed on said post, a yoke for supporting said ball race out of engagement with said sleeve, and means for releasing said yoke to permit said ball race to move into engagement with said sleeve.

3. A braking apparatus for preventing the shifting of a propellent grain in a rocket casing, comprising, a first plate secured to an end wall of said casing, means including a post secured to said first plate, a second plate movably connected to said first plate and engaging said propellent grain, a coil spring between said plates for urging said second plate to bear upon said propellent grain, means including an internally tapered sleeve mounted on said second plate coaxial with said post, a ball race coaxially disposed on said post, means for supporting said ball race out of engagement with said sleeve, and explosive operated means for releasing said supporting means to permit said ball race to move into engagement with said sleeve.

4. In a sustainer rocket having a casing, and a propellent grain in the casing, braking apparatus permitting movement of the grain in the casing in response to temperature variations but restraining grain movement as a result of reverse setback or shock following launching of the rocket, comprising a plate secured to the casing, a pressure plate bearing against the grain, and a braking unit between said plates, said braking unit including a housing secured to the pressure plate, a post secured to the first mentioned plate and extending into the housing, means for coupling the post to the housing in locked relation, means engaging said coupling means for initially retaining the post and housing in unlocked relation, whereby said grain may move in response to temperature variations, and explosive operated means for shifting said last mentioned means out of engagement with the coupling means.

5. The apparatus recited in claim 4, wherein the coupling means includes a tapered sleeve in the housing about the post, a ball race surrounding the post and engageable with the sleeve, and a spring urging the ball race toward the sleeve.

6. Braking apparatus for controlling the relative movement of a pair of plates, including a housing mounted on one of the plates, a post on the other of said plates and extending into the housing, means for locking the post to the housing, means normally maintaining the post and housing in unlocked relation, and explosive means in the housing and operable, upon detonation, for releasing said last-mentioned means, whereby the first-mentioned means will function to lock the post to the housing.

7. Braking apparatus as recited in claim 6, wherein said first-mentioned means consists of a tapered sleeve in the housing and a ball race surrounding the post and engageable with the sleeve, and said second-mentioned means consists of a yoke movably mounted in the housing and engageable with the ball race.

8. Braking apparatus as recited in claim 7, wherein the explosive means includes a block slidably mounted in the housing and mounting the yoke, and explosive bellows mounted in the block.

No references cited.